United States Patent [19]

Ferrari et al.

[11] 3,920,515
[45] Nov. 18, 1975

[54] FUEL ASSEMBLY FOR A NUCLEAR REACTOR

[75] Inventors: Harry M. Ferrari, Edgewood; Douglas L. Miller; Long S. Tong, both of Pittsburgh, all of Pa.

[73] Assignee: Westinghouse Electric Corporation, Pittsburgh, Pa.

[22] Filed: Sept. 26, 1972

[21] Appl. No.: 292,379

[52] U.S. Cl. .................................................. 176/78
[51] Int. Cl. ............................................. G21c 3/34
[58] Field of Search ................................. 176/78, 76

[56] References Cited
UNITED STATES PATENTS

| | | | |
|---|---|---|---|
| 3,379,617 | 4/1968 | Andrews et al. | 176/78 |
| 3,664,924 | 5/1972 | Krawiec | 176/78 |
| 3,715,275 | 2/1973 | Krawiec | 176/78 |

Primary Examiner—Harvey E. Behrend
Attorney, Agent, or Firm—J. R. Campbell

[57] ABSTRACT

A fuel assembly including multiple open channel grids for holding fuel rods and control rod guide thimbles in predetermined fixed relationship with each other. Metallic straps are interwoven to form a grid or egg crate configuration having openings which receive the fuel rods and guide thimbles. To properly support and cool the fuel rods near the grid-fuel rod interface, springs and dimples on the grid straps project into each opening, the dimples being oriented in a direction to permit flow of coolant upwardly therethrough. To minimize turbulence in coolant flow, the leading edge of each grid strap is provided with cutout sections which form scallops effective in channeling coolant in a uniform flow path through the network of grid openings.

5 Claims, 9 Drawing Figures

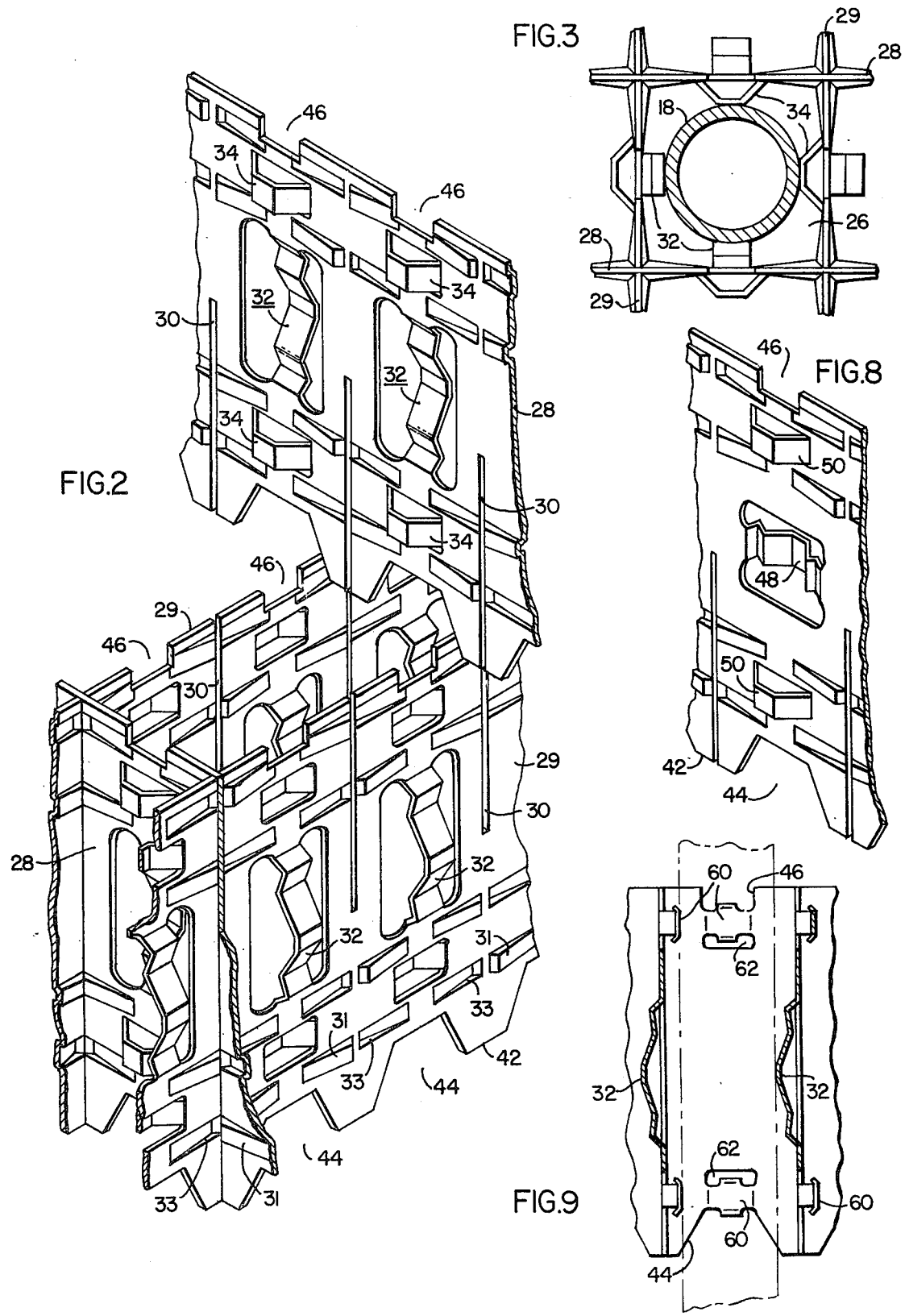

FUEL ASSEMBLY FOR A NUCLEAR REACTOR

BACKGROUND OF THE INVENTION

The invention described herein relates to nuclear reactors and more particularly to an improved design of open channel grid used to hold an array of fuel rods and/or control rod guide thimbles in a nuclear reactor fuel assembly.

Each fuel assembly in a nuclear reactor of the type used in electrical power plants, includes about 200 fuel rods in addition to about 25 control rod guide thimbles. These rods and thimbles are held in precise lateral relationship with each other by a number of open channel grids positioned along the fuel assembly length. The subject matter of this invention relates to an improved design of open channel grid. U.S. Pat. No. 3,379,617 — H. N. Andrews et al., assigned to the same assignee as the present invention, discloses a basic design of grid used for accurately orienting and holding fuel rod and control rod guide thimbles in position in the fuel assembly.

As disclosed in the Andrews et al patent, the grid consists of thin metal straps interwoven to form a grid of egg-crate configuration having openings in which the separate fuel rods and guide thimbles are located. A pair of spring fingers project into each opening from the walls of adjacent straps and metal dimples project inwardly into the same opening from the other two adjacent straps. The combination of springs and dimples comprises a spring mass system which supports each fuel rod or guide thimble placed in the grid openings. The spring mass system thus serves to import lateral support to the fuel rods and guide thimbles when subjected to hydraulic and vibratory forces existing in an operating reactor.

During the course of testing the above grid design prior to actual incorporation in a reactor, it was found that the dimple presented a slight impediment to flow of coolant upwardly along the length of each fuel rod. As a result, localized hot spots formed on the fuel rods near the dimple-fuel rod interface. The effect of this impediment was that partial stagnation of coolant occurred in the area of the grid and the volume of liquid needed to adequately cool the rod hot spots did not flow in heat exchange relationship with the fuel rod surfaces. The rod surfaces adjacent the dimple then exceeded the design temperature for the fuel rods. An important disadvantage of having fuel rods, or parts thereof, operate at temperatures not accounted for in the design is that the reactor would need to be operated at a reduced power level, i.e., at a temperature which would accommodate the highest temperature in the fuel rod.

Test results further showed that the leading edge of the open channel grid caused diversion in coolant flow. As the liquid coolant contacted the grid leading edge, it departed from its uniform pattern and moved non-linearly through the grid.

BRIEF SUMMARY OF THE INVENTION

Briefly, stated, this invention eliminates the disadvantages by orienting each dimple on the grid straps in a manner to permit coolant flow through the dimples, rather than around them, to secure uninterrupted flow with consequent elimination of hot spots at undesirable locations along each fuel rod length. Greater uniformity in flow through the grid is achieved by moving the grid leading edges to a point close to the dimples and springs in the grid network and shaping the leading edge to a configuration which minimizes diversion of flow to unwanted areas.

An object of the invention therefore is to provide a nuclear reactor fuel assembly including an improved design of open channel grid which eliminates hot spots in fuel rods positioned therein.

Another object of the invention is to provide an open channel grid which minimizes the restriction of flow as liquid coolant moves upwardly through each fuel assembly.

Still another object of the invention is to reduce the number of open channel grids used to support fuel rods and guide thimbles in a fuel assembly.

Still another object of the invention is to reduce the strap thickness as much as possible through the use of re-inforcing ribs thereby minimizing the amount of parasitic neutron absorber in the grid.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings, wherein:

FIG. 2 shows the disposition of straps used to form the open channel grid and illustrates the position and orientation of springs and dimples used for firmly holding the fuel rods or guide thimbles in position;

FIG. 3 is a plan view showing the disposition of a fuel rod and coacting straps used for holding the rod in position;

FIG. 8 is a modification of the invention; and

FIG. 9 is still another modification of the invention.

Figure 1:
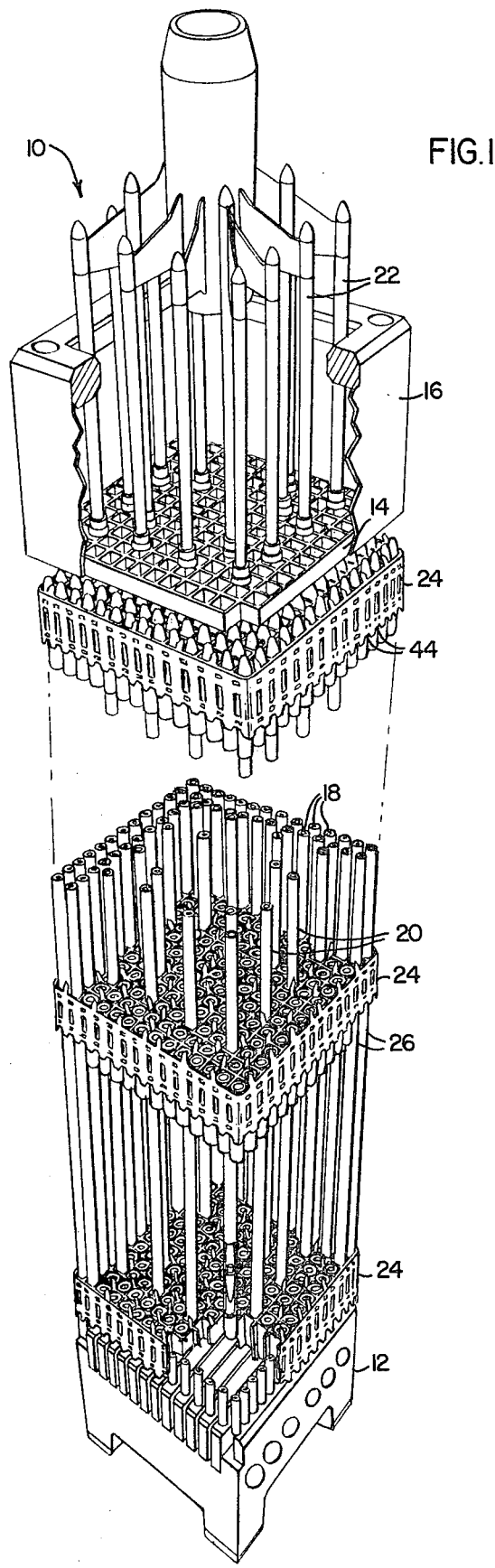
FIG. 1 is a perspective view of a fuel assembly which includes the improved open channel grid of this invention.

Referring now to the drawings, wherein like reference characters designate like or corresponding parts throughout the several views, there is shown in FIG. 1 a fuel assembly 10 designed for use in a nuclear reactor. The assembly includes a base 12 and an upper plate 14 enclosed in housing 16. An array of fuel rods 18 are supported by the base and control rod guide thimbles 20, if used, are interspersed among the fuel rods, the guide thimbles being of a size sufficient to accept control rods 22 arranged for selective insertion in the guide thimbles by a control rod drive mechanism (not shown). To precisely orient the fuel rods and control rod guide thimbles in the assembly, a number of open channel grids 24 of egg-crate configuration are spaced along the fuel assembly length. The openings 26 formed in the egg-crate receive the fuel rods and guide thimbles in the manner shown in FIG. 3 to thus achieve positioning the fuel rods and guide thimbles in a predetermined and fixed relationship with each other.

Referring now to the grid illustration in FIGS. 2–7, a plurality of straps 28 and 29 are interwoven at right angles to form the egg-crate design mentioned above. Each strap is of thin metal and includes slots 30 designed to lock adjacent straps together when the straps are assembled by interleaving and subsequently welded or brazed along their abutting edges. To help assure exact positioning of the straps relative to each other, both prior to and after joining ribs or projections 31 and 33 are bent outwardly toward opposite sides of each strap. When the straps are interleaved, the projections engage the strap sides and firmly hold them in position.

It is essential that each fuel rod be maintained at a substantially fixed distance with respect to adjacent fuel rods in order to assure that liquid coolant circulated upwardly along the rods will absorb the heat generated by the rods during the fission process. Should the rods be displaced towards each other by hydraulic or vibratory forces resulting from coolant flow through the assembly, and such displacement places adjacent rods too close to each other, the coolant cannot absorb the heat generated in the area of displacement to maintain the fuel rod surface temperature within the design limits. Because of this, a spring mass system which effectively provides for some lateral displacement, but not in an amount sufficient to adversely affect reactor performance, is incorporated in each strap.

This system includes a spring 32 which projects inwardly from each of two adjacent straps 28 and 29 while the other two adjacent straps which form an opening, contain a pair of spaced dimples 34. FIG. 3 clearly shows the arrangement. It will be understood that each opening contains the above-described springs and dimples. While the Andrews et al patent describes the spring mass system in detail, the dimples therein are at 90° to that shown in FIGS. 2–7 hereof and create hot spots and coolant stagnation as described above.

To overcome this disadvantage, the dimples 34 are oriented in a direction to permit coolant to flow upwardly between the inner walls of each dimple and the strap surface to thus maintain uniformity of coolant flow in the assembly. The coolant then is caused to flow in direct heat exchange relationship with the fuel rod surfaces and absorb maximum heat while still maintaining the fuel rod surfaces at a temperature well within the design limits.

Figure 4:
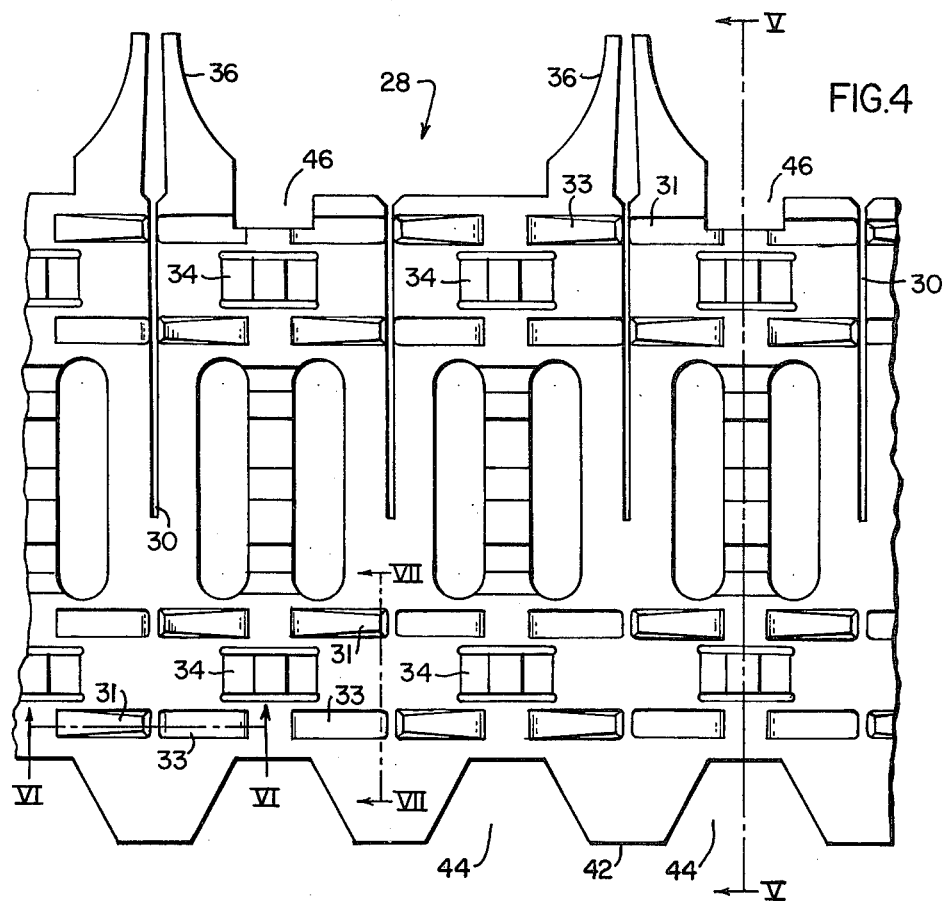
FIG. 4 is a view in elevation of a section of a grid strap illustrated in FIG. 2.
Figure 6:
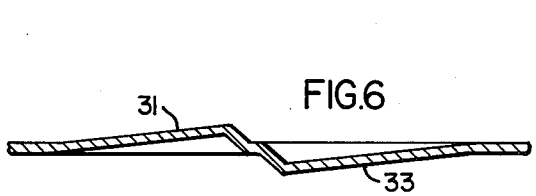
FIG. 6 is a view taken on lines VI—VI of FIG. 4 illustrating the arrangement used for imparting structural strength to the grid straps and thereby permitting a thinner strap for equivalent strength.
Figure 5:
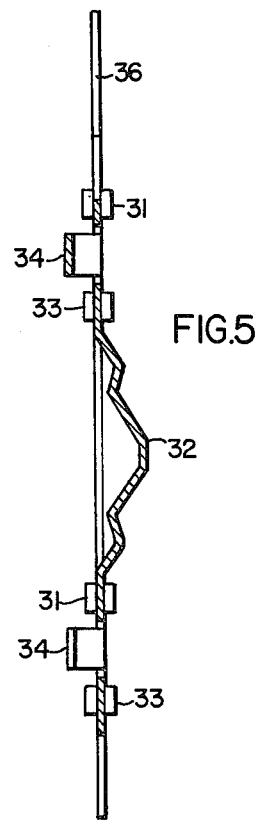
FIG. 5 is a view of the grid strap taken on lines V—V of FIG. 4.
Figure 7:
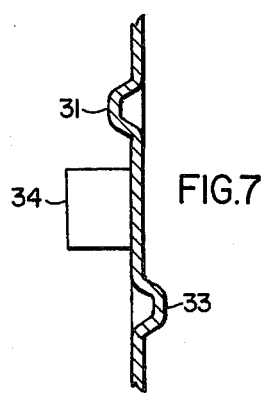
FIG. 7 is a view taken on lines VII—VII of FIG. 4.

As illustrated in FIGS. 4 and 5, each grid strap further includes a multiplicity of vanes 36 (not shown in FIG. 2) projecting upwardly from the trailing edge of each strap and these vanes are arranged to be bent into the coolant flow path for causing the coolant to flow through a prescribed path in the fuel assembly.

To minimize distortion in coolant flow as the coolant moves upwardly the grid, the leading edge 42 is serrated or made to a scallop-like design by stamping out sections of the metal and thus leaving a trapezoidal shaped slot 44 which helps facilitate the flow of coolant into the grid. The slot is cut in the grid below the upstream dimple 34 and as shown in FIG. 4, it is wide at the bottom of the grid and narrows to the width of the dimple at the dimple level. A slot 46 equal to width of the downstream dimple is also cut in the trailing edge of the grid. The effect of the slots in the grid is to create an open channel around the dimple. This open channel helps avoid buildup of a boundary layer around the fuel rods disposed in each grid and thereby helps facilitate the flow of coolant into the grid area.

In view of the increase in flow of coolant through the fuel assembly as a result of making the above-described changes, it has been found that a fuel assembly with one less grid can be used since the remainder can effectively support and channel the flow of coolant through the fuel rods.

Consideration of the design described above will show that a fuel rod or guide thimble located in a grid opening will have six points of contact, i.e., each of the two springs have a single point of contact and dimples provide four points of contact, the arrangement being such that the numerous contacting points effectively serve to maintain the fuel rods in a set position in the grid structure.

In some designs, it may be desirable to have only four points of contact, especially under circumstances where turbulence results from the coolant striking the flat surface presented by the flat lower portion of the springs. FIG. 8 illustrates a modification wherein the springs 48 are positioned 90° from that shown in FIGS. 3–4. The dimples 50 however are of the same design as that shown in FIGS. 3 and 4 but are moved to a point on the grid opposite the springs. By utilizing this kind of arrangement, there is no impediment to flow of liquid cooled through the grid except for those edge surfaces of the springs and dimples contacted by the coolant as it flows therethrough.

In FIG. 9, the springs 32 are formed by punching and deforming sections of the central part of each strap as described above. Likewise, the trapezoidal and rectangular shaped slots 44 and 46 is punched from the strap material adjacent the strap edges and at uniform distances along the strap length, such distances corresponding to the spacing of each fuel or guide thimble in the fuel assembly. The dimples 60 however are formed by a portion of the strap material which respectively defines the trapezoidal and rectangular shaped slots. As shown, the cut 62 is made slightly inwardly of the slots and the remaining material then deformed to form the body of the dimple. The amount of material used to form the dimple and the distance of cut 62 from the slot edge are chosen consistent with the material strength needed to withstand the hydraulic and vibratory forces to which the straps will be exposed.

In view of the above, it will be apparent that many modifications and variations are possible in light of the above teachings. It therefore has to be understood that within the scope of the appended claims, the invention may be practiced other than as specifically described.

What is claimed is:

1. A fuel assembly for a nuclear reactor comprising:
   an array of fuel rods mounted between a base and an upper support member;
   at least one open channel grid positioned on said assembly for laterally supporting and holding said fuel rods in spaced relationship with each other;
   said open channel grid comprising multiple straps interwoven with each other to form a grid of egg-crate configuration which forms openings for reception of said fuel rods;
   resilient means formed integral with said straps and projecting from adjacent straps into each opening to contact a fuel rod therein;
   rigid means projecting from the other adjacent straps into each opening to contact the remaining sides of said fuel rod and impart lateral support thereto;
   each of said rigid means comprising sections of a grid strap deformed inwardly to form a dimple having an opening extending axially of said grid so that liquid coolant flowing through said grid and along the fuel rod length moves in a substantially uninterrupted path past said dimples; and multiple first cutout sections on the leading edges of each said straps disposed adjacent to and in axial alignment with each of said rigid means to, said multiple first cutout sections defining a serrated configuration help avoid the build up of a boundary layer of coolant around each fuel rod.

2. A fuel assembly according to claim 1 wherein each of said cutout sections is of trapezoidal configuration.

3. The fuel assembly according to claim 1 wherein each rigid means on each of said other adjacent straps which extend into each opening are axially spaced from each other along the strap height and are located respectively at the leading edge and the trailing edge of said straps; and multiple second cutout sections formed in the trailing edge of each of said straps, each of said second cutout sections being located in axial alignment with said first cutout sections and said rigid means.

4. The fuel assembly according to claim 1 wherein the upper and lower ends of the dimple of each rigid means are bent at an angle to the plane of the straps in which they are located.

5. The fuel assembly according to claim 1 wherein each strap contains axially extending slots which receive the body portion of adjacent straps thus permitting interweaving of the straps to form the egg crate openings, means on each strap in alignment with said slots for holding said straps in fixed relationship with each other, said means comprising tabs of strap material having ends which project outwardly from opposite sides of each strap, said tab ends being arranged to face each other and spaced a distance sufficient to receive the thickness of a strap which is interwoven therewith, and at least two pairs of said tabs spaced along the strap height, so that when the straps are interwoven, said pairs of tabs engage opposite sides of each strap placed in said slots to thereby hold said straps in immovable and fixed relationship with each other.

* * * * *